Nov. 28, 1967 A. CSICSATKA 3,355,552

BIASING ARRANGEMENT FOR AUTOMATIC STEREOPHONIC RADIO RECEIVER

Filed June 30, 1964 2 Sheets-Sheet 1

INVENTOR:
ANTAL CSICSATKA,
BY Norman C. Fulmer
HIS ATTORNEY.

BIASING ARRANGEMENT FOR AUTOMATIC STEREOPHONIC RADIO RECEIVER

Filed June 30, 1964 2 Sheets-Sheet 2

INVENTOR:
ANTAL CSICSATKA,
BY Norman C. Fulmer
HIS ATTORNEY.

United States Patent Office 3,355,552

Patented Nov. 28, 1967

3,355,552

BIASING ARRANGEMENT FOR AUTOMATIC STEREOPHONIC RADIO RECEIVER

Antal Csicsatka, Utica, N.Y., assignor to General Electric Company, a corporation of New York Filed June 30, 1964, Ser. No. 379,246
4 Claims. (Cl. 179—15)

Figure 1:
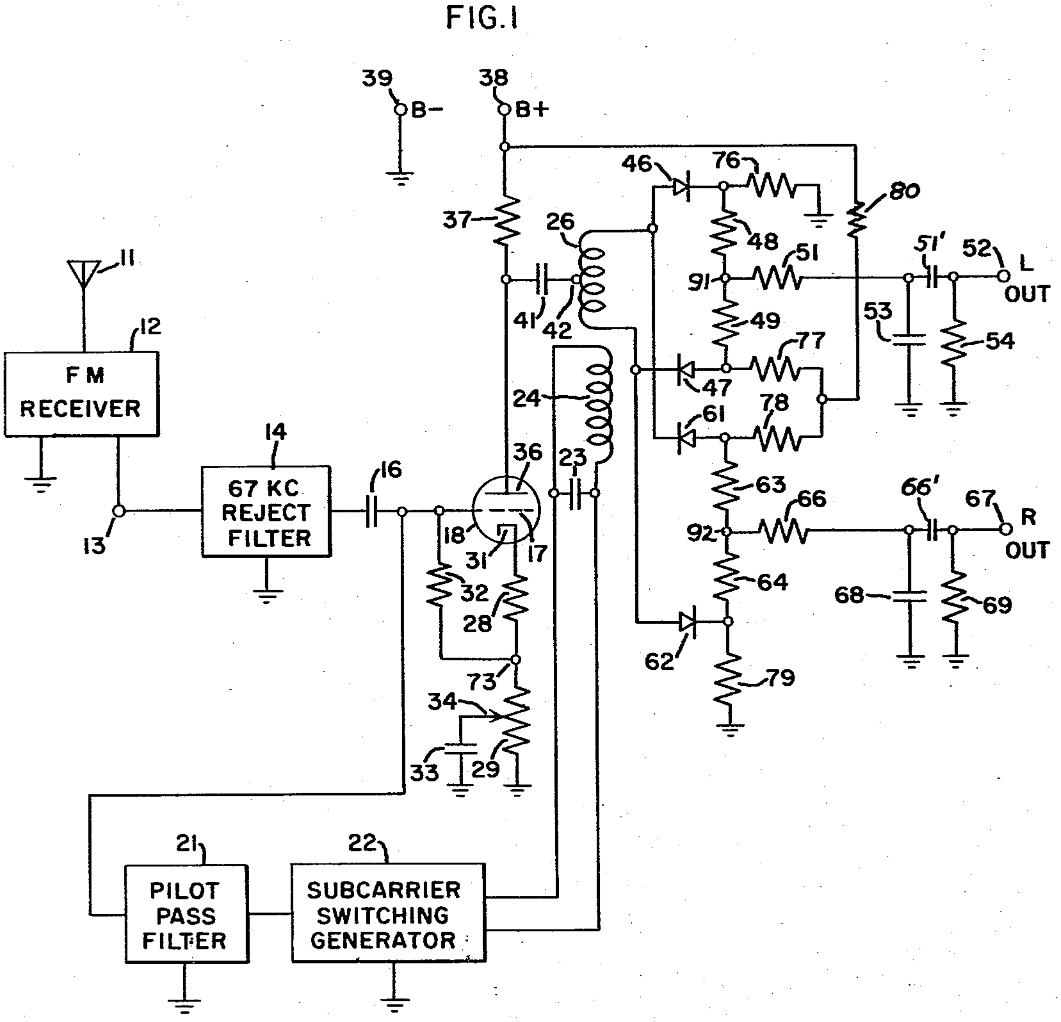

This invention relates to stereophonic radio reception, and particularly to receivers which automatically function correctly for the alternative reception of monophonic signals and stereophonic signals.

The invention is particularly useful for the reception of both conventional monophonic FM broadcasts, and stereophonic FM broadcasts per the present broadcasting standards in which audio signals L and R, which represent respectively the audio signals generated by left and right microphones, for example, are transmitted by modulating the frequency of a main carrier in accordance with the amplitude variation of the sum of the two signals, i.e., $L+R$ and the main carrier also is frequency modulated with the amplitude variations of the sideband products resulting from an amplitude modulation of a 38 kilocycle per second subcarrier with a difference combination of the two stereo signals, i.e., $L—R$. The 38 kilocycle subcarrier is suppressed so that it does not accompany the other components of the broadcast signal. A subharmonic 19 kilocycle pilot signal is transmitted in a frequency gap provided for that purpose, and functions as a reference signal at receivers for reconstituting the 38 kilocycle subcarrier.

The combination of the $L+R$ signal, the $L—R$ sidebands of the suppressed subcarrier, and the pilot signal, is called the "composite" signal.

In order to derive the separate L and R audio signals from the composite signal, it has heretofore been proposed, in accordance with well-known theory, that one of these signals be derived by sampling the composite signal at times corresponding to the positive excursions of the 38 kilocycle suppressed subcarrier and that the other stereo signal be derived by sampling the composite signal at times corresponding to the negative excursions of the 38 kilocycle subcarrier wave. This sampling is performed by a sampling circuit that is controlled by a 38 kilocycle switching signal derived in a switching signal generator from or under the control of the pilot signal. For example, if samples of the left stereo signal are obtained during excursions of the switching signal corresponding in time to positive excursions of the subcarrier, then samples of the right stereo signal R are obtained during excursions of the switching signal corresponding in time to negative excursions of the subcarrier. Each of the signals L and R is then frequency de-emphasized, if they have been pre-emphasized at the transmitter (in well-known manner) so as to yield the original audio signals L and R (and also a certain amount of cross-talk signals) at separate outputs for application (after amplification if desired) to separate "left" and "right" loudspeakers.

In the above-described arrangement, diodes are commonly used for providing the switching function. Although two diodes will suffice, an arrangement of four diodes is preferable. The diodes are arranged to pass portions of the composite signal to a "left" signal output terminal during times corresponding to the positive excursions of the subcarrier, and to pass portions of the composite signal to a "right" signal output terminal during times corresponding to the negative excursions of the subcarrier. This is achieved by alternately turning the various diodes on and off by means of a 38 kc. switching signal. For monophonic reception, with the 38 kc. switching signal absent, the monaural signal will automatically pass through the diodes to the left and right output terminals but will become badly distorted due to the non-linear electrical impedance characteristics of the diodes. Obviously, one or more of the diodes in each of the L and R channels could be biased to the fully-conductive condition so as to pass the monaural signal without any appreciable distortion. However, either this bias would have to be removed for stereo reception, or else the 38 kc. switching signal used for stereo reception would have to be considerably increased in magnitude to over-ride the fixed bias on the diodes, which not only adds to the cost of the circuit but also introduces undesired noise components into the stereophonic output signals.

An object of the invention is to provide an improved receiver which automatically adjusts for proper reception of monophonic and stereophonic signals.

Another object is to provide an improved automatic monophonic-stereophonic receiver circuit which obviates the need for an appreciably increased magnitude of switching signal.

A further object is to provide an improved automatic monophonic-stereophonic receiver circuit of the type employing diodes in a time-sampling stereo demodulation, which achieves a reduction in diode impedance in the path of the monophonic signal.

Other objects will be apparent from the following disclosure and claims, and from the accompanying drawing.

The invention comprises, briefly and in its preferred embodiment, a stereo demodulator circuit having a separate pair of diode circuits associated with each of the L and R output signal channels and adapted to be switched alternately on and off to sample a desired portion of the composite signal to provide a stereophonic output signal, and biasing means associated with each of the pairs of diode circuits for shifting the impedance versus voltage characteristic curves thereof relatively apart to an extent such that the combined parallel impedance of the pair of diode circuits will be substantially constant with respect to voltage.

Figure 2:
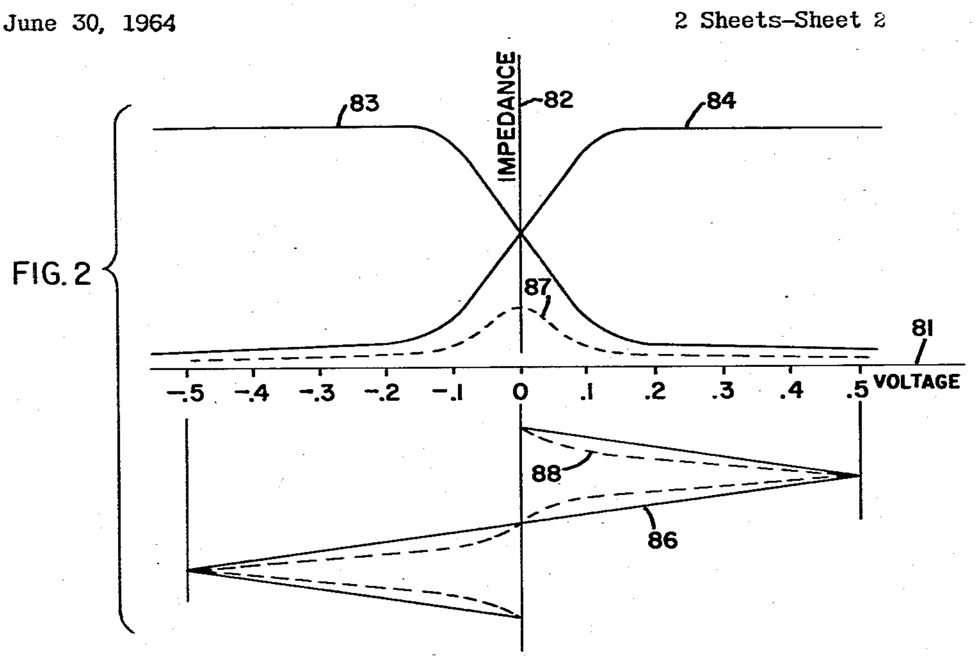
Figure 3:
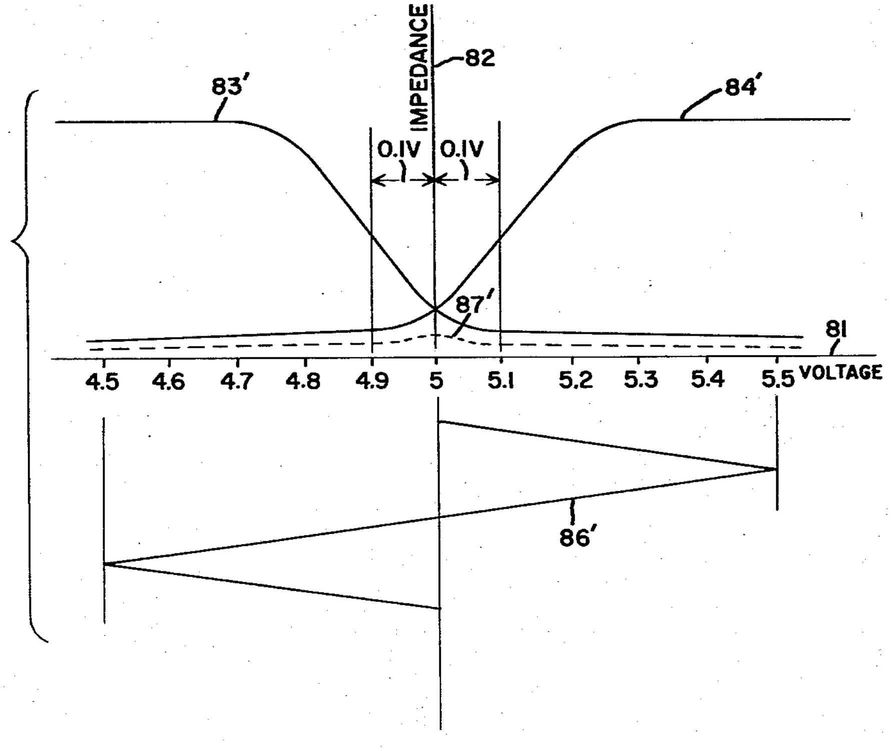

In the drawing, FIGURE 1 is an electrical schematic diagram of a preferred embodiment of the invention, FIGURE 2 is a plot of impedance versus voltage characteristic curves of a pair of diode circuits in a stereo demodulator circuit not employing the invention, and also illustrates monophonic signal distortion caused thereby, and FIGURE 3 is a plot of impedance versus voltage characteristics of a pair of diode circuits in the stereo demodulator circuit of FIGURE 1, in accordance with the invention.

Now referring to the circuit of FIGURE 1 of the drawing, an antenna 11 picks up the FM stereo signal in a normal manner, and applies it to an FM receiver circuit 12 which normally includes a mixer circuit, intermediate amplifier stages, and a demodulator of the limiter-discriminator type or ratio-detector type. The output of the FM receiver 12 comprises, at the output terminal 13 thereof, the composite signal which comprises the $L+R$ signal combination in a range of some 50 to 15,000 cycles per second, a pilot signal (at 19 kilocycles per the FCC standards) and $L—R$ sidebands of a suppressed amplitude modulated subcarrier, these sidebands extending between 23 kc. and 53 kc. The signal at output terminal 13 also might include a commercial program signal in the vicinity of 67 kc. The signals are fed, from terminal 13, through a 67 kc. reject filter 14 which rejects the commercial program signal, and the FM stereo composite signal then is fed through a coupling capacitor 16 to a control electrode 17 of an amplifier device 18 which may be of the vacuum tube type.

The stereo composite signal also is fed, via the coupling capacitor 16, through a pilot signal pass filter 21 which passes only the 19 kc. pilot signal, and this pilot signal is applied to a subcarrier switching generator 22 which may be a synchronous oscillator, a frequency-doubling amplifier, or other circuit arrangement for doubling the frequency of the 19 kc. pilot signal. An output tuned circuit of the switching generator 22, shown as comprising a tuned circuit having a capacitor 23 connected in parallel with an inductor 24, is inductively coupled to a winding 26.

A bias resistor 28 and a potentiometer resistance element 29 are connected, in the named order, between a cathode 31 of tube 18 and electrical ground. A resistor 32 is connected between the control grid 17 and the junction of the resistors 28 and 29. A capacitor 33 is connected between an adjustable tap 34 of the potentiometer 29 and electrical ground, and functions to increase the amplitude of the $L-R$ sidebands with respect to the $L+R$ portion of the composite signal, at the output anode 36 of the tube 18, as is fully described in co-pending patent application Ser. No. 269,374, filed Apr. 1, 1963, now U.S. Patent No. 3,258,540 and assigned to the same assignee as the present invention. A load resistor 37 is connected between the anode 36 and a terminal 38 of B+ operating voltage of which the negative terminal 39 is electrically grounded. A coupling capacitor 41 is connected between the anode 36 and a center tap 42 of the winding 26.

The stereo demodulator circuit, which in the embodiment shown in the drawing is of the time-sampling type, includes a "left" signal sampling circuit comprising a pair of diodes 46, 47 having unlike electrodes connected respectively to the ends of the winding 26. A pair of load resistors 48, 49 are connected in series between the remaining electrodes of the diodes 46, 47, and a resistor 51 and a capacitor 51′ are connected between the junction of the resistors 48, 49, and a left signal output terminal 52. A capacitor 53 is connected between the junction of resistor 51 and capacitor 51′ and ground, and, in conjunction with the resistor 51, forms a conventional de-emphasis circuit for the audio signal. A resistor 54 is connected between the output terminal 52 and electrical ground.

Similarly, a "right" signal sampling circuit comprises a pair of diodes 61, 62 having unlike electrodes connected respectively to the ends of the winding 26, these electrodes being unlike the electrodes of the diodes 46, 47 which are connected to the winding 26, as shown. Load resistors 63 and 64 are connected in series between the remaining electrodes of the diodes 61 and 62, and a resistor 66 and capacitor 66′ are connected between a "right" signal output terminal 67 and the junction of resistors 63 and 64. A capacitor 68 is connected between electrical ground and the junction of resistor 66 and capacitor 66′, and, in conjunction with the resistor 66, provides a well-known de-emphasis circuit for the "right" stereo output signal. A resistor 69 is connected between the terminal 67 and electrical ground.

The circuit thus far described has previously been known, and functions as follows for stereo reception. The stereo composite signal is amplified by the amplifier device 18, and is applied through the capacitor 41 to the center tap 42 of the winding 26 of the sampling circuit. The subcarrier switching generator 22, under control of the pilot signal which is selectively passed by the filter 21, produces a 38 kc. switching signal at the tuned circuit 23–24, and this switching signal is inductively coupled to the winding 26. During the half-cycles of this switching signal when the upper end of winding 26 is positive and the lower end thereof is negative, both of the diodes 46 and 47 will be biased into a conductive condition, whereupon the composite signal passes through the two halves of the secondary winding 26, and through the respective diodes 46, 47 and the resistors 48, 49, to the de-emphasis network comprising resistor 51 and capacitor 53. If the sampling signal is properly phased with respect to the suppressed subcarrier, as is well-known to those skilled in the art, this sampling of the composite signal during a half-cycle of switching voltage, will provide a "left" stereo signal at the output terminal 52.

During the other half-cycles of the switching signal, i.e., when the upper end of winding 26 is negative and the lower end thereof is positive, both of the diodes 61 and 62 will be rendered conductive, whereupon the composite signal will pass through the respective halves of the winding 26, from the input center tap 42 thereof, and through the diodes 61 and 62 and resistors 63 and 64, respectively, to the de-emphasis network 66–68, thereby providing a sample of the "right" stereo signal at the output terminal 67, in a manner well-known to those skilled in the art.

For automatic reception of a monophonic signal in accordance with a preferred embodiment of the invention, each of the circuits of diodes 46, 47, 61, and 62, in combination with their respective load resistors 48, 49, 63, and 64, is based slightly forwardly into the conductive condition by means of resistors 76, 77, 78, and 79. The resistors 76 and 79 are connected between the B— terminal 39 and the cathodes of diodes 46 and 62, respectively, and the resistors 77 and 78 are connected, in series with a common voltage dropping resistor 80, between the B+ terminal 38 and the anodes of diodes 47 and 61, respectively. This circuitry causes the impedance versus voltage characteristic curves of the pair of diodes 46 and 47 and their load resistors 48 and 49, and also of the pair of diodes 61 and 62 and their load resistors 63 and 64, to shift relatively apart, in directions providing lower impedance at the signal operating point, by an amount so as to provide a substantially constant and low value of impedance for the monophonic signal through the parallel diode paths of each of the pairs of diodes 46–47 and 61–62. The biasing resistors 76, 77, 78, and 79 function, in cooperation with the resistors 48, 49, 63, and 64, to provide a voltage dividing network for causing the aforesaid shifting of the diode impedance characteristic curves, as will be described more fully with reference to FIGURE 3.

The foregoing functioning of the invention will now be explained in further detail with reference to FIGURES 2 and 3, it first being mentioned that the subcarrier switching generator 22 is of a type which is active to produce a switching signal only when a stereophonic signal is being received, and does not produce any switching signal when a monophonic signal is being received. This is readily accomplished if the subcarrier switching generator 22 is a frequency doubling amplifier for producing an amplified 38 kc. signal whenever a 19 kc. pilot signal appears at the output of filter 21. This can also be accomplished if the subcarrier switching generator 22 is a synchronous oscillator which oscillates only in the presence of a 19 kc. synchronizing signal, which can be achieved in various ways such as by providing a relay at the output of filter 21 which is adapted, when actuated by the 19 kc. pilot signal, to activate a synchronous oscillator in the subcarrier switching generator 22, such as by applying the operating voltage thereto.

In each of FIGURES 2 and 3, the horizontal axis (abscissa) 81 represents voltage and the vertical axis (ordinate) 82 represents diode circuit impedance, which is primarily resistive. In FIGURE 2, curve 83 represents the impedance versus voltage characteristic of diode 46, and curve 84 represents the impedance versus voltage characteristic of diode 47, in the pair of diodes associated with the "left" stereo signal output terminal 52, when the invention is not employed. Likewise, the curve 83 represents the impedance versus voltage characteristic of diode 62, and curve 84 represents the impedance versus voltage characteristic of diode 61, in the pair of diodes associated with the "right" stereo signal output terminal 67 when the invention is not employed. In FIGURE 3, the numerals 83′ and 84′ represent the corresponding diode characteristics when the invention is employed.

For convenience, FIGURE 2 will first be described in detail, to facilitate an understanding of the stereo demodulator diode operation for monophonic reception, when the invention is not employed. The characeristic curves 83 and 84 of the respective diodes in each pair of diodes, cross over at zero voltage, as shown, in the absence of any biasing voltages being applied thereto. A monophonic signal 86, shown as a triangularly shaped wave for convenience, when applied to the center tap 42 of the winding 26, passes partially through each of the diodes 46 and 47 to the left output terminal 52, and also passes partially through each of the diodes 61 and 62 to the right output terminal 67. The combined impedance curve for the pair of diodes 46–47 is indicated by the dashed curve 87. The combined impedance curve of the pair of diodes 61–62 will also be as indicated by the curve 87. The combined impedance curve 87 is not linear, but instead has a considerably higher value of impedance at the region of zero voltage. This non-linearity of impedance characteristic causes the monophonic signal 86 to become distorted, whereby it appears in the shape of the dashed signal curve 88 at the output terminals 52 and 67. The values of voltage in FIGURE 2 are representative of a typical stereo receiver circuit, in which the monophonic input signal to the tap 42 has a peak-to-peak amplitude of approximately one volt.

Now referring to FIGURE 3, which illustrates the operation of the circuit of FIGURE 1 in accordance with the invention, the biasing resistors 76 through 79 provide a quiescent forward biasing voltage on each of the diodes 46, 47, 61, and 62, the bias across each of diodes 46 and 62 being approximately 0.1 volt, and the bias across each of diodes 47 and 61 being approximately 0.1 volt, as illustrated in FIGURE 3. Expressed another way, the characteristic curves of each pair of the diode circuits (from signal input point 42 to each of the signal output points 91 and 92), nominally cross over at 5 volts in the example given, and each of these curves is shifted .1 volt from the 5 volt reference point, in mutually opposite directions as indicated in FIGURE 3, by an extent such that the combined impedance curve 87′ is substantially flat so as to provide a linear and constant value of impedance with respect to signal voltage. Thus, the monophonic input signal 86′ applied to the center tap 42 of coil 26, will pass through each of the pairs of diode circuits and to the respective left and right output terminals 52 and 67 without any appreciable distortion. By linearizing the combined characteristic curve 87′ for each of the pairs of diodes, not only has signal distortion been eliminated, but also the total impedance of the pairs of diodes in series with the monophonic signal has been reduced, thereby increasing the average energy output of the monophonic signal at the output terminals 52 and 67.

In the preferred embodiment of the invention, load resistors 48, 49, 63, 64 are respectively inserted in series with the switching diodes 46, 47, 61, and 62, and the suitable bias voltages are respectively applied to the junctions of these diodes and load resistors by means of the resistors 76, 77, 78, and 79. Instead of being connected to the signal output sides of the diodes as shown, the load resistors and bias resistors could be connected at the signal input sides of the diodes in which event the relative values of applied bias voltage would have to be reversed.

As will be apparent from the foregoing description, the objectives of the invention have been realized, in that the circuit automatically receives monophonic and stereophonic signals correctly, and does so without the need for changing the biasing of the stereo demodulator diodes to different values for proper reception of these signals, and without the necessity of appreciably increasing the amplitude of the stereophonic switching signal as would be the case if one or more of the stereo demodulator diodes were biased to be in the completely "on" condition in order to pass the monophonic signal. To illustrate the latter point, in accordance with the example given above, in the circuit of the invention the diode characteristic curves are shifted by only about one tenth of a volt, and thus would have no appreciable effect on the functioning of the switching voltage which normally is about 4 or 5 volts peak to peak, whereas if the diodes were biased at approximately one volt for full condition as would be required for suitably passing the monophonic signal, then the switching voltage would have to be appreciably increased in magnitude in order to suitably override this one volt fixed bias on the diodes, which increase in switching voltage not only would add to the cost of the circuit, but would also add undesired noise which inherently accompanies the switching signal.

While a preferred embodiment of the invention has been shown and described, various other embodiments and modifications thereof will be apparent to those skilled in the art, and will fall within the scope of invention as defined in the following claims.

What I claim is:

1. In a stereophonic demodulator circuit including left and right signal sampling circuits, each signal sampling circuit having a pair of diode circuits each containing a diode and being effectively connected in parallel in the path of a composite stereophonic signal, said diodes being connected for signal conduction in mutually opposite directions in said diode circuits, and switching means for causing said diodes to become switched simultaneously from non-conduction to the conduction state at periodic intervals for sampling the composite signal to derive a stereophonic output signal, said diodes having a combined parallel impedance versus voltage characteristic curve which is non-linear in the quiescent state, the improvement comprising applying a biasing voltage to means for biasing said pair of diodes during both stereophonic and monophonic operation to establish a single bias condition to shift the impedance versus voltage characteristic curves of said diode circuits relatively apart in a direction and to an extent that the combined parallel impedance thereof is substantially constant with respect to signal voltage, whereby a monophonic signal can pass through said parallel diode circuits substantially undistorted.

2. A demodulator circuit as claimed in claim 1, in which said biasing means comprises means connected to apply voltage to each of said diodes to forward bias each of said diodes to accomplish said shifting of the impedance versus voltage characteristic curves relatively apart.

3. A demodulator circuit for automatic reception of monophonic and composite stereophonic signals, including left and right signal sampling circuits, each signal sampling circuit comprising a common input impedance, means to apply said monophonic and composite stereophonic signals to said input impedance, a stereophonic signal output terminal, a first diode circuit comprising a first diode and first load resistor connected in series between an end of said input impedance and said signal output terminal, a second diode circuit comprising a second diode and second load resistor connected in series between the other end of said input impedance and said output terminal, said first and second diodes being connected for signal conduction therethrough in mutually opposite directions, switching signal means adapted during reception of a composite stereophonic signal to switch said diodes simultaneously from non-conduction to conductive condition at periodic intervals for sampling the composite signal to derive a stereophonic output signal at said output terminal, and biasing means connected to apply different biasing voltages at the junction of said first diode and first load resistor and at the junction of said second diode and second load resistor during both stereophonic and monophonic operation to establish a single bias condition, said biasing voltages having values to cause the impedance versus signal voltage characteristic curves of said first and second diode circuits to shift relatively apart in a direction and to an extent that the combined parallel impedance thereof is substantially constant with respect to signal voltage, whereby said monophonic signal can pass through said diode circuits substantially undistorted to said output terminal.

4. A demodulator circuit for automatic reception of monophonic and composite stereophonic signals, comprising an input winding, means to apply said monophonic and composite stereophonic signals to the center of said input winding, first and second stereophonic signal output terminals, a first diode circuit comprising a first diode and first load resistor connected in series between an end of said input winding and said first signal output terminal, a second diode circuit comprising a second diode and second load resistor connected in series between the other end of said input winding and said first signal output terminal, a third diode circuit comprising a third diode and third load resistor connected in series between the first-named end of the input winding and said second signal output terminal, a fourth diode circuit comprising a fourth diode and fourth load resistor connected in series between said other end of the input winding and said second signal output terminal, said first and second diodes being connected for signal conduction therethrough in mutually opposite directions, said third diode being connected for signal conduction therethrough in a direction opposite to that of said first diode, and said fourth diode being connected for signal conduction therethrough in a direction opposite to that of said second diode, a switching signal generator adapted during reception of a composite stereophonic signal to apply to said input winding a switching signal for causing said diodes to switch into and out of conduction at periodic intervals for sampling the composite signal to derive stereophonic output signals at said output terminals, a source of bias voltage, a first biasing resistor connected between a first terminal of said source of bias voltage and the junction of said first diode and first load resistor, a second biasing resistor connected between said first terminal of the source of bias voltage and the junction of said fourth diode and fourth load resistor, a third biasing resistor connected between the second terminal of the source of bias voltage and the junction of said second diode and second load resistor, and a fourth biasing resistor connected between said second terminal of the source of bias voltage and the junction of said third diode and third load resistor, said biasing resistors applying biasing voltages to said junctions to establish a single bias condition during both stereophonic and monophonic operation to cause the impedance versus signal voltage characteristic curves of said first and second diode circuits, and also of said third and fourth diode circuits, to shift relatively apart in a direction and to an extent that the combined parallel impedance of said first and second diode circuits, and also of said third and fourth diode circuits, is substantially constant with respect to signal voltage, whereby said monophonic signal can pass through said diode circuits substantially undistorted to said first and second signal output terminals.

References Cited

UNITED STATES PATENTS

| | | | |
|---|---|---|---|
| 3,167,615 | 1/1965 | Wilhelm et al. | 179—15 |
| 3,225,143 | 12/1965 | Parker | 179—15 |
| 3,315,038 | 4/1967 | Zwollo | 179—15 |

JOHN W. CALDWELL, *Primary Examiner.*

ROBERT L. GRIFFIN, DAVID G. REDINBAUGH, *Examiners.*

UNITED STATES PATENT OFFICE
CERTIFICATE OF CORRECTION

Patent No. 3,355,552 November 28, 1967

Antal Csicsatka

It is certified that error appears in the above identified patent and that said Letters Patent are hereby corrected as shown below:

Column 6, line 33, after "comprising" insert -- biasing means for --; lines 33 and 34, cancel "means for biasing --.

Signed and sealed this 27th day of January 1970.

(SEAL)
Attest:

Edward M. Fletcher, Jr.
Attesting Officer

WILLIAM E. SCHUYLER, JR.
Commissioner of Patents